United States Patent [19]

Cook

[11] Patent Number: 4,602,338

[45] Date of Patent: Jul. 22, 1986

[54] IMPEDANCE MEASUREMENT IN 4-WIRE TO 2-WIRE CONVERTERS

[75] Inventor: John W. Cook, Ipswich, England

[73] Assignee: British Telecommunications, London, England

[21] Appl. No.: 528,575

[22] Filed: Sep. 1, 1983

[30] Foreign Application Priority Data

Sep. 2, 1982 [GB] United Kingdom ............... 8224999

[51] Int. Cl.⁴ .......................................... G01R 27/14
[52] U.S. Cl. ................. 364/482; 179/175.2 C;
179/175.3 R; 324/64; 324/57 R
[58] Field of Search ............ 364/482, 481; 324/57 R,
324/57 PS, 57 SS, 57 Q, 60, 62, 64; 179/175,
175.1 R, 175.11, 175.2 R, 175.2 C, 175.3 R,
175.3 F, 175.31 R, 175.31 E, 170 D, 170 NC

[56] References Cited

U.S. PATENT DOCUMENTS

| | | | |
|---|---|---|---|
| 3,790,723 | 2/1974 | Stewart | 179/175.3 R |
| 4,214,311 | 7/1980 | Nakashima et al. | 364/482 |
| 4,342,089 | 7/1982 | Hall | 364/481 |
| 4,404,636 | 9/1983 | Campbell, Jr. et al. | 364/482 |
| 4,408,282 | 10/1983 | Hof | 364/482 |

OTHER PUBLICATIONS

Bell, D. J., "A Computer Based, Four Terminal Impedance Measuring System for Low Frequencies", *Journal of Physics E*, Jan. 1975, vol. 8, No. 1, pp. 66–70.

Primary Examiner—Gary Chin
Assistant Examiner—Joseph L. Dixon
Attorney, Agent, or Firm—Nixon & Vanderhye

[57] ABSTRACT

An oscillating input signal is applied to the 4-wire input terminals which is monitored while the 4-wire output terminals and the 2-wire terminals are also monitored. This procedure is performed with a first known reference impedance connected across the 2-wire terminals and then repeated with a second reference impedance similarly connected. A plurality of input frequencies may be applied over the range of 400 Hz to 4000 Hz.

20 Claims, 5 Drawing Figures

IMPEDANCE MEASUREMENT IN 4-WIRE TO 2-WIRE CONVERTERS

A 4-wire to 2-wire converter is usually located in a transmission line between one section consisting of a single pair of wires which carries signals in both directions, and another section consisting of two pairs of wires which each carry signals only in a single direction. Such transmission lines typically form part of a telephone system and in this case the 4-wire to 2-wire converter forms all or part of a subscriber line interface circuit which couples a pair of wires forming the subscriber's line which is eventually connected to the telephone handset to the single direction, switched communication channels in a telephone exchange.

When testing such 4-wire to 2-wire converters there are two parameters that are particularly important and these are the 2-wire output or terminating impedance and the transhybrid loss which is a measure of the coupling that takes place between the input and output terminals on the 4-wire side of the converter. The transhybrid loss depends upon, amongst other things, the impedance of the transmission line connected to the 2-wire terminals. It is important to be able to determine the impedance of the transmission line connected to the 2-wire side of the converter which will provide the maximum transhybrid loss.

In the past both of these impedance measurements have been performed manually, the 2-wire output or terminating impedance being measured using a conventional impedance bridge circuit. To measure the impedance which, when connected to the 2-wire side of the converter produces the maximum transhybrid loss is performed by connecting variable resistance and capacitance boxes to the 2-wire side of the converter and then applying a signal to the input terminals of the 4-wire side of the converter and monitoring the output obtained from the output terminals of the 4-wire side of the converter. The impedance connected to the 2-wire side of the converter is varied by manually adjusting the resistance and capacitance boxes until the minimum output from the output terminals on the 4-wire side of the converter is obtained.

According to the first aspect of this invention a method of determining impedance parameters of a 4-wire to 2-wire converter comprises connecting a first known reference impedance across the 2-wire terminals of the converter, feeding an oscillating input signal into the input terminals of the 4-wire side of the converter, monitoring the input signal fed into the converter and the signals output across the 2-wire terminals and the output terminals of the 4-wire side of the converter, connecting a second known reference impedance across the 2-wire terminals, feeding an oscillating input signal into the input terminals of the 4-wire side of the converter, monitoring the input signal fed into the converter and the output signals across the 2-wire terminals and the output terminals of the 4-wire side of the converter, and calculating from the monitored signals impedance parameters of the 4-wire to 2-wire converter.

Preferably this method is repeated using oscillating input signals of different frequencies so that the impedance parameters can be evaluated over a range of different frequencies. Typically the impedance parameters would be monitored over 14 different frequencies extending over a range from 200 Hz to 4000 Hz.

According to another aspect of this invention an apparatus for determining impedance parameters of a 4-wire to 2-wire converter comprises means to generate an oscillating signal and apply it to the input terminals of the 4-wire side of the converter, a first and second known reference impedance, comparator means to compare two oscillating signals and produce an output representative of the ratio of the magnitudes of the two signals, means to feed the signal applied to the input terminals of the 4-wire side of the converter also to the comparator means, switch means to connect the first or the second known reference impedance across the 2-wire terminals of the converter and also to connect the 2-wire terminals or the output terminals of the 4-wire side of the converter to the comparator means, and a programmed computer to calculate the impedance parameters of the converter from the outputs of the comparator means and the values of the first and second reference impedances.

Preferably the means to generate an oscillating signal is capable of generating oscillating signals at a number of different frequencies and, in this case, the apparatus is arranged to determine the impedance parameters of the converter at a number of different frequencies. Preferably the means to generate an oscillating signal and the comparator means are formed by a network analyser. Preferably the apparatus also includes a variable impedance and in this case the switch means are also arranged to connect this variable impedance across the 2-wire side of the converter. The variable impedance can then be used to check the results obtained by this invention. Thus, the variable impedance may be set to that value calculated as providing the maximum transhybrid loss and then, when the switch means connects the variable impedance across the 2-wire side of the converter comparison of the input signal to the input terminals of the 4-wire side of the converter with the output signal from the output terminals of the 4-wire side of the converter enables the transhybrid loss to be monitored to ensure that it is sufficiently large and, for example, to ensure that it is above a predetermined threshold value. The value of the variable impedance may be set manually to the calculated value or, alternatively, the programmed computer may be arranged to control the variable impedance to set it to the computed optimum value automatically.

Preferably the apparatus also includes means connected across the 2-wire side of the converter to provide a DC path between the two terminals to absorb the DC component of the output on the 2-wire side of the converter to ensure that the first and second reference impedances are de-coupled from any DC feed currents so that differences in the DC resistance of the first and second impedances do not affect the measurements. Preferably the DC path connected to the 2-wire side of the converter includes a variable resistor so that its resistance can be varied to simulate changes in the length of the 2-wire transmission line connected to the 2-wire side of the converter. The apparatus may also include means to apply a variable phase offset to the oscillating signal applied to the input terminals of the 4-wire side of the converter. Adjustment of the offset applied to the oscillating signal enables the comparator means to avoid particular phase differences of, for example, 180°, between the two signals fed to the comparator means. This enhances the accuracy of the comparison made by the comparator means.

The apparatus may also include a chart plotter connected to the programmed computer to provide a graphical output of the results of the impedance parameter measurement of the converter. Preferably the first and second known reference impedances are arranged to correspond to the typical maximum and minimum impedances that the converter is designed to operate into and such a choice of values for the two reference impedances gives the most accurate results.

A particular example of a method and apparatus in accordance with this invention will now be described with reference to the accompanying drawings in which.

Figure 1:
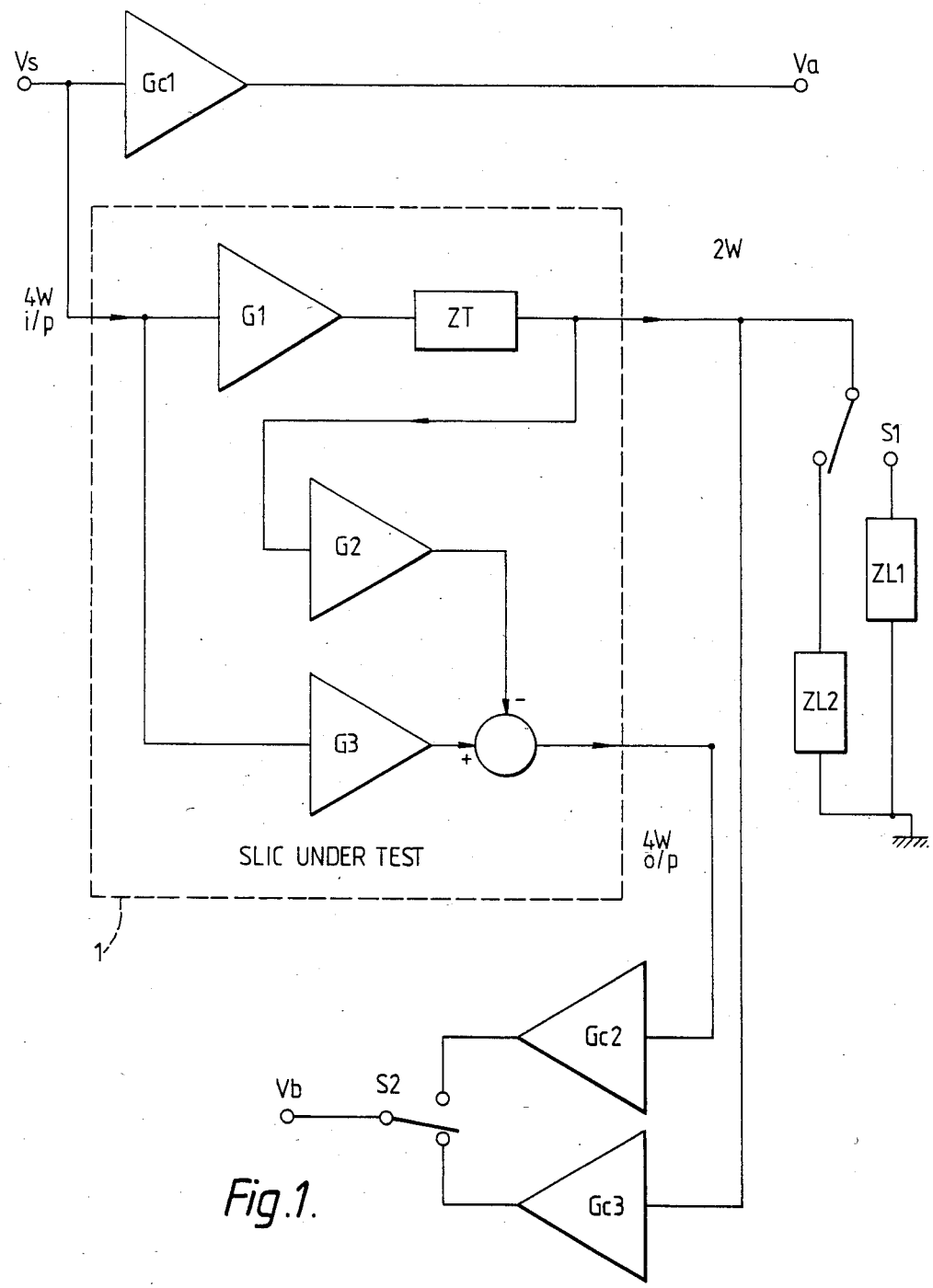
FIG. 1 is a simplified equivalent circuit diagram of the apparatus.

This example measures the impedance parameters of a subscriber line interface circuit used in a telephone system as an interface between a 2-wire pair connected to the subscriber's handset and two, 2-wire pairs forming single direction communication channel in a telephone exchange. In the method in accordance with this invention two different known impedance networks are connected to the 2-wire side of the subscriber line interface circuit whilst an oscillating signal is fed into the 4-wire input of the subscriber line interface circuit. The ratio of the magnitude of the input signal to the magnitude of the output from both the 2-wire side and the 4-wire side are measured and then, from these measured values the impedance parameters of the subscriber line interface circuit are calculated. FIG. 1 shows a simplified version of the test circuit in which the subscriber line interface circuit 1 is represented by a model consisting of an unknown 4-wire to 2-wire complex voltage gain G1 with an unknown complex output impedance ZT. The 4-wire output consists of a linear sum of the 4-wire input and the 2-wire output each multiplied by predetermined voltage gains G3 and G2 respectively. This model is valid for all linear time invariant subscriber line interface circuits, however the 2-wire to 4-wire conversion is performed. The test circuit applies an oscillating test signal to the 4-wire input and one of two known reference impedance networks ZL1 or ZL2 is connected to the 2-wire side as a load. Which of the two reference impedance networks is connected is controlled by a switch S1. The input voltage Vs applied to the 4-wire input is taken from Va and the output voltage from either the 2-wire side or the 4-wire output is taken from Vb in accordance with the position of switch S2. There are unkown complex calibration errors as a result of the apparatus used to make the measurements of Gc1 between the input signal Vs and the measuring point Va, Gc2 between the 4-wire output and the measuring point Vb, and Gc3 between the 2-wire side and the measuring point Vb.

The analysis of the calculations that are performed to provide the impedance parameters of the subscriber line interface circuit 1 such as its output impedance ZT and the optimum impedance ZLopt that provides the minimum signal on the 4-wire output will now be demonstrated:

With switch S1 connected to impedance network ZL1 and switch S2 connecting the 2-wire output to Vb $$Vb/Va = G21 = (Vs.G1.ZL1.Gc3/(ZT+ZL1))/(Vs.Gc1) \quad (1)$$

With switch S1 connected to impedance network ZL2 and switch S2 connecting the 2-wire output to measuring point Vb $$Vb/Va = G22 = (Vs.G1.ZL2.Gc3/(ZT+ZL2))/(Vs.Gc1) \quad (2)$$

With switch S1 connected to impedance network ZL1 and switch S2 connecting the 4-wire output to measuring point Vb $$Vb/Va = G41 = (Vs.G3.Gc2 - Vs.(G21.Gc1/Gc3).G2.Gc2)/(Vs.Gc1) \quad (3)$$

With switch S1 connected to impedance network ZL2 and with switch S2 connecting the 4-wire output to measuring point Vb $$Vb/Va = G42 = (Vs.G3.Gc2 - Vs.(G22.Gc1/Gc3).G2.Gc2)/(Vs.Gc1) \quad (4)$$

By dividing equation (1) by equation (2) we obtain $$G21/G22 = (ZL1.(ZT+ZL2))/(ZL2.(ZT+ZL1)) \quad (5)$$
$$<=> G21.ZL2.ZT + G21.ZL2.ZL1 = G22.ZL1.ZT + G22.ZL1.ZL2$$
$$<=> ZT(G21.ZL2 - G22.ZL1) = ZL1.ZL2.(G22 - G21)$$
$$<=> ZT = ZL1.ZL2.(G22 - G21)/(G21.ZL2 - G22.ZL1)$$

This gives us an expression of the output impedance ZT of the subscriber line interface circuit 1 in terms of the impedance of the two known impedance networks ZL1 and ZL2 and of the measured ratios of the input and output signals.

From equations (1) and (2) we obtain separate expressions for ZT $$ZT = G1.ZL1.Gc3/(Gc1.G21) - ZL1$$

$$ZT = G1.ZL2.Gc3/(Gc1.G22) - ZL2$$

by eliminating ZT we get $$G1.ZL1.Gc3.G22 - ZL1.Gc1.G21.G22 = \quad (6)$$
$$G1.ZL2.Gc3.G21 - ZL2.Gc1.G21.G22$$
$$<=> G1.Gc3.(ZL1.G22 - ZL2.G21) = G21.G22.Gc1.(ZL1 - ZL2)$$
$$<=> G1 = G21.G22.Gc1.(ZL1 - ZL2)/(Gc3.(ZL1.G22 - ZL2.G21))$$

By subtracting equation (4) from equation (3) we get $$G41 - G42 = (G22 - G21).G2.Gc2/Gc3 \quad (7)$$
$$<=> G2 = (G41 - G42).Gc3/((G22 - G21).Gc2)$$
From $(3).G22 - (4).G21$
$$G41.G22 - G42.G21 = G3.Gc2.(G22 - G21)/Gc1 \quad (8)$$
$$<=> G3 = Gc1.(G41.G22 - G42.G21)/(Gc2.(G22 - G21))$$

Thus we have equations for G1, G2 and G3 in terms of the measured amplitude ratios between the input and output signals and in terms of the unknown complex calibration factors Gc1, Gc2 and Gc3, and of the known reference impedances ZL1 and ZL2.

The optimum impedance ZLopt to be connected to the 2-wire side of the subscriber line interface circuit 1 is that which gives the minimum 4-wire output thus by equating the 4-wire output to zero and making the impedance connected to the 2-wire side equal to ZLopt we get $$G3 - G1.G2.ZLopt/(ZLopt + ZT) = 0 \quad (9)$$
$$<=> G1.G2.ZLopt = G3.ZLopt + G3.ZT$$
$$<=> ZLopt.(G1.G2 - G3) = G3.ZT$$
$$<=> ZLopt = G3.ZT/(G1.G2 - G3)$$

Now substituting equations (5), (6), (7) and (8) into equation (9) we get $$ZLopt = (Gc1.(G41.G22 - G42.G21)/(Gc2.(G22 - G21))). \quad (10)$$
$$(ZL1.ZL2.(G22 - G21)/(G21.ZL2 - G22.ZL1))/((G21.G22.Gc1.$$
$$(ZL1 - ZL2)/(Gc3.(ZL1.G22 - ZL2.G21))).((G41 - G42).Gc3/$$
$$((G22 - G21).Gc2)) - Gc1.(G41.G22 - G42.G21)/(Gc2.(G22 - G21)))$$

Simplifying this equation by eliminating common factors and multiplying both the numerator and denominator by $$(G21.ZL2 - G22.ZL1) \text{ we get}$$
$$ZLopt = (G41.G22 - G42.G21).ZL1.ZL2.(G21 - G22)/G21.$$
$$G22.(ZL1 - ZL2).(G41 - G42) + (G41.G22 - G42.G21).(G21.ZL2 - G22.ZL1))$$

Expanding just the denominator to $$G21.G22.ZL1.G41 + G21.G22.ZL2.G42 - G21.G22.ZL1.G42 -$$
$$G21.G22.ZL2.G41 + G41.G22.G21.ZL2 + G42.G21.G22.ZL1 -$$
$$G42.G21.G21.ZL2 - G41.G22.G22.ZL1$$

Eliminating the common terms, and factoring the remaining terms the denominator expression becomes $$(G21 - G22).(G22.G41.ZL1 - G21.G42.ZL2) \text{ thus}$$
$$ZLopt = (G41.G22 - G42.G21).ZL1.ZL2/(G22.G41.ZL1 - G21.G42.ZL2)$$

thus an expression for ZLopt is obtained which is also dependent entirely upon the impedance of the two known impedance networks ZL1 and ZL2 and the measured ratios of the input and output signals.

If assumptions are made with regard to the values of the complex calibration errors by, for example equating them with likely values or by equating them to one it is also possible to obtain by calculation the gain of the subscriber line interface circuit 1 in each direction, that is G1 and G2. The gain G1 is particularly useful since this is the open circuit gain of the subscriber line interface circuit 1 but this is derived by calculation from measurements made whilst the subscriber line interface circuit 1 is not under open circuit condition and is thus considerably more reliable than any measurements made on the subscriber line interface circuit when the 2-wire side of the circuit is unterminated.

Figure 2:
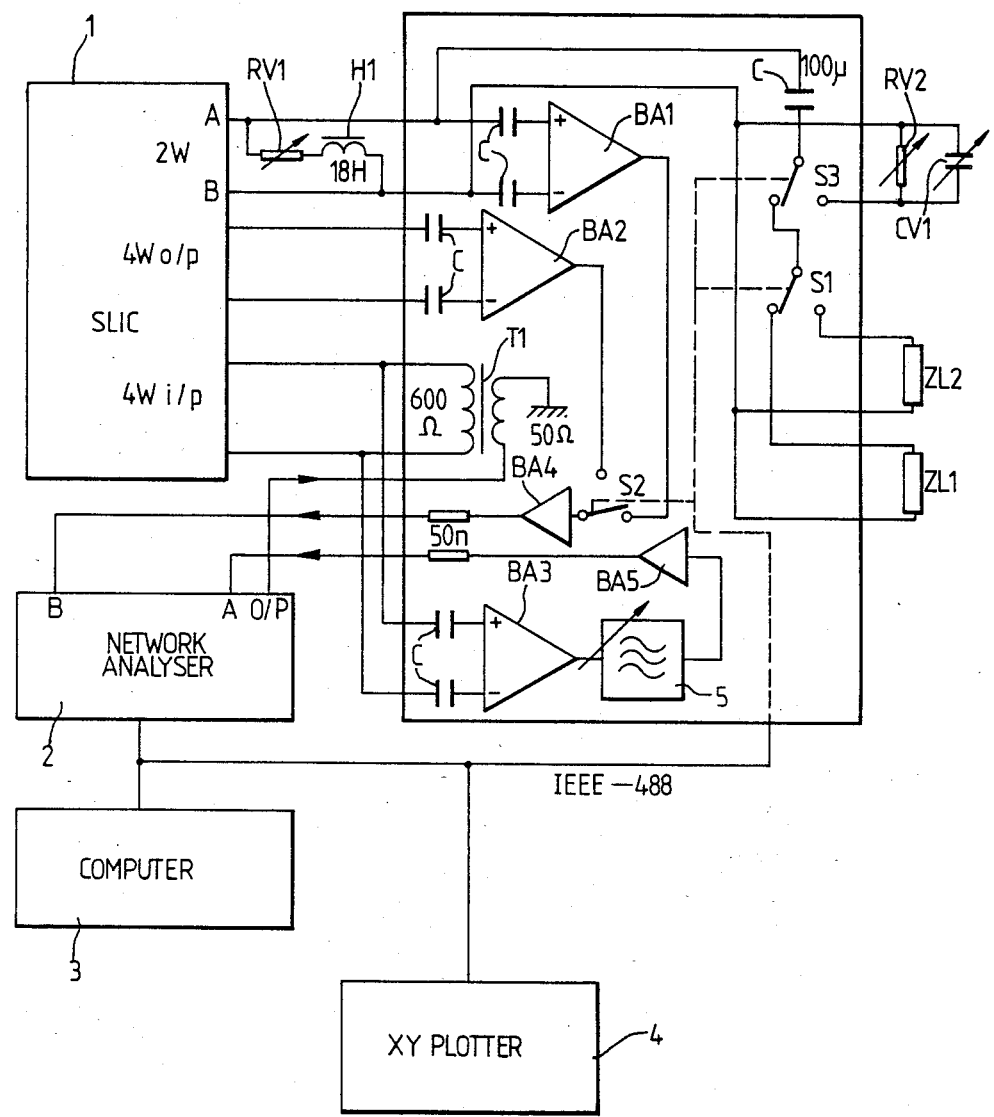
FIG. 2 is a block diagram of the apparatus.
Figure 3:
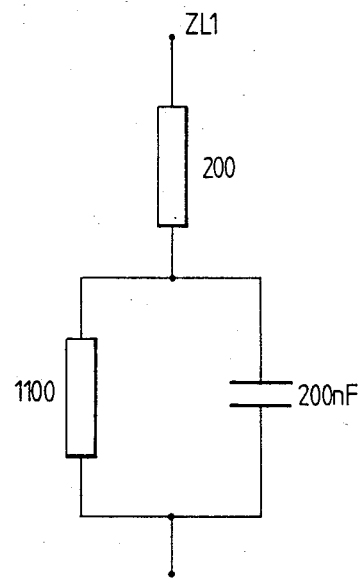
FIG. 3 is a circuit diagram of the first reference impedance circuit.
Figure 4:
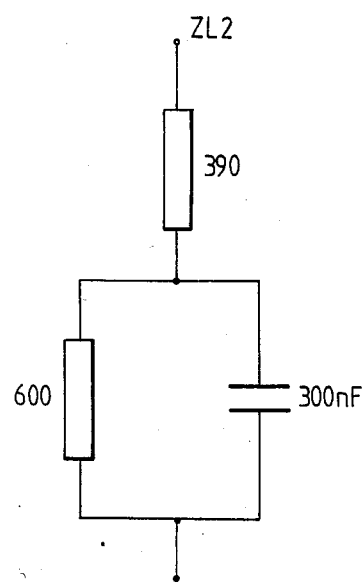
FIG. 4 is a circuit diagram of the second impedance network.

The practical version of the apparatus for performing the above method is shown in FIG. 2. The apparatus comprises a network analyser 2 such as a Hewlett Packard network analyser marketed under the reference HP3042A, a programmed computer 3 such as a Hewlett Packard desk top calculator type HP9825A, an XY plotter 4 such as a Hewlett Packard plotter reference HP9872B, and three relays S1, S2 and S3 all connected together by a common interface IEEE-488 bus. The apparatus also includes two known reference impedance networks ZL1 and ZL2 which are shown in more detail in FIGS. 3 and 4 respectively, a transformer T1, buffer amplifiers BA1 to BA5, a DC path provided by a variable resistor RV1 and inductance H1, and a variable allpass filter 5. The apparatus also includes a number of DC blocking capacitors C, a variable resistance RV2 and variable capacitance CV1. The network analyser 2 provides an oscillating output signal at a frequency within a range from 200 Hz to 4000 Hz and the frequency of this output signal is determined by the values programmed into the programmed computer 3. This output is fed via the transformer T1 which matches the 50 ohm impedance of the output signal with a 600 ohm impedance of the subscriber line interface circuit into the 4-wire input of the subscriber line interface circuit 1. The oscillating output signal from the network analyser is also fed via DC blocking capacitor C through buffer amplifier BA3 and the variable all pass filter 5 through buffer amplifier BA5 which again just serves as an impedance matching device into a first input of the network analyser 2. The 2-wire side of the subscriber line interface circuit 1 has the DC path formed by the variable resistor RV1 and inductance H1 connected across its terminals and the value of the resistance of this DC path can be varied by using variable resistor RV1 to simulate different lengths of transmission line connected to the 2-wire side of the subscriber line interface circuit 1. Reference impedance networks ZL1 and ZL2 are connected across the 2-wire side of the subscriber line interface circuit 1 via the relay contacts S1 or, alternatively, the impedance network formed by the variable resistor RV2 and variable capacitor CV1 are connected across the 2-wire side of the subscriber line interface circuit 1 via relay contacts S3. The output from the 2-wire side of the subscriber interface circuit 1 is connected via DC blocking capacitors C and buffer amplifier BA1 to relay contacts S2. The 4-wire output of the subscriber line interface circuit 1 is connected via DC blocking capacitor C and buffer amplifier BA2 to the contacts of relay S2. Depending on the position of relay S2 the 2-wire or the 4-wire output from the subscriber line interface circuit 1 is connected by buffer amplifier BA4 to the second input of the network analyser 2. Buffer amplifier BA4 again acts as a simple impedance matching device.

The computer 3 is programmed so that an output signal of the first frequency is fed to the 4-wire input of the subscriber line interface circuit and then, the reference impedance network ZL1 is connected across the 2-wire side of the subscriber line interface circuit 1 by relay S1. The output from the 2-wire side of the circuit 1 is fed via relay S2 to the second input of the network analyser where it is compared with the input signal fed into the 4-wire input and returned via the first input of the network analyser 2. Then the relay S2 is changed to connect the 4-wire output to the second input of the network analyser 2, so that this is then compared with the input to the 4-wire side of the circuit 1 in the analyser 2. The relay contacts S1 are then changed to connect the second reference impedance network ZL2 to the 2-wire side of the circuit 1 and the process repeated. The results produced by the network analyser 2 are stored in the computer 3 as are the impedance values of the two reference networks ZL1 and ZL2. The computer 3 then performs a calculation set out above to provide an output of the optimum impedance to be connected to the 2-wire side of the circuit 1 to provide maximum transhybrid loss and to provide the output impedance of the circuit. These results are plotted on the plotter 4. The programmed computer 3 then repeats this sequence of operations with output signals of a second frequency from the network analyser 2. These results are in turn plotted and this process is repeated for, for example, 14 different frequencies.

After this measurement operation the calculated optimum impedance values can be checked by setting the variable resistors RV2 and variable capacitors CV1 to provide an impedance network having the optimum impedance. This is then connected to the 2-wire side via relay contacts S3 and the 4-wire output from the circuit 1 can be checked to determine that it is below some lower threshold limit to ensure that a high transhybrid loss exists across the subscriber line interface circuit when terminated by the derived optimum impedance.

The network analyser 2 is poor at measuring the ratio cf the input and output signals when one is at a phase angle of zero whilst the other is at a phase angle of about 180°. To enable this situation to be avoided the variable all pass filter 5 can be adjusted to vary the phase angle between the input and output signals. If, for example, the calculation at one of the 14 different frequencies gives values of the output impedance and the optimum impedance which are widely different from the remainder this test can be repeated with the setting of the all pass filter varied. Equally, if the computed value of the optimum impedance does not give a high trans-hybrid loss then the setting of the all pass filter can also be varied and the tests be repeated.

Figure 5:
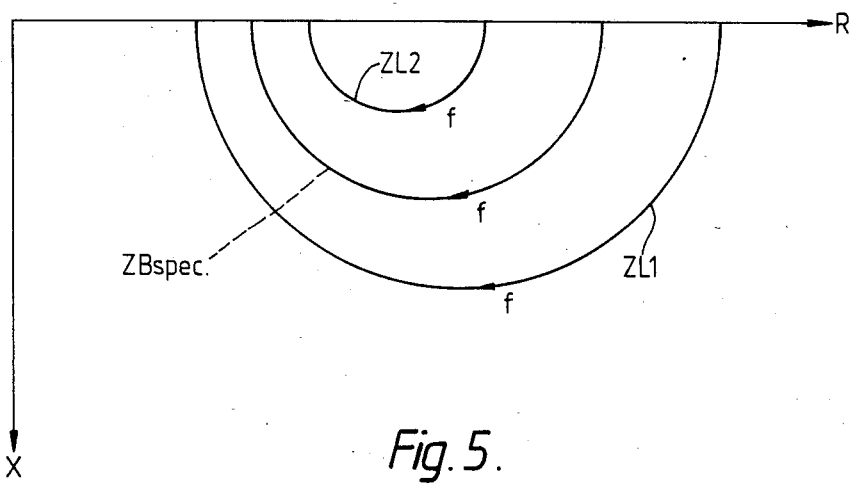
FIG. 5 is a graph illustrating the impedance of the network shown in FIGS. 3 and 4, and a typical impedance of a converter being tested.

Preferably the impedance networks ZL1 and ZL2 are provided by a parallel connected resistor and capacitor which are then connected in series with a further resistor. Preferably the components have their values shown in FIGS. 3 and 4. The impedance of the networks ZL1 and ZL2 are chosen so that they represent typical maximum and minimum optimum impedances for subscriber line interface circuits under test. This ensures that the tests performed on the circuit 1 are most accurate since it ensures that the minimum difference exists between the optimum impedance and the two known reference impedances ZL1 and ZL2 whilst, at the same time having as large a difference as possible between the two reference impedances ZL1 and ZL2. FIG. 5 is a graph showing the typical impedance of both ZL1 and ZL2 plotted with variable frequency in relation to the ideal impedance ZB spec. for the circuit 1.

I claim:

1. A method of determining impedance parameters of a 4-wire to 2-wire converter comprising the steps of:
   (a) connecting a first known reference impedance across the 2-wire terminals of said converter;
   (b) feeding an oscillating input signal into input terminals of a 4-wire side of said converter;
   (c) monitoring said input signal fed into said converter and signals output across said 2-wire terminals and the output terminals of said 4-wire side of said converter;
   (d) connecting a second known reference impedance across said 2-wire terminals;
   (e) feeding an oscillating input signal into said input terminals of said 4-wire side of said converter;
   (f) monitoring said input signal fed into said converter and signals output across said 2-wire terminals and said output terminals of said 4-wire side of said converter; and,
   (g) calculating from said monitored signals said impedance parameters of said 4-wire to 2-wire converter.

2. The method of claim 1, wherein said steps (a) to (g) are repeated using oscillating input signals of different frequencies whereby said impedance parameters of said converter are evaluated over a range of different frequencies.

3. The method of claim 2 wherein said impedance parameters are monitored over a plurality of different frequencies extending over a range from 400 Hz to 4000 Hz.

4. The method of claim 3, wherein said plurality of frequencies comprise fourteen different frequencies.

5. A method of determining impedance parameters of a 4-wire to 2-wire converter comprising the steps of:
   (a) connecting a first known reference impedance across the 2-wire terminals of said converter;
   (b) feeding an oscillating input signal into input terminals of a 4-wire side of said converter;
   (c) monitoring said input signal fed into said converter and signals output across said 2-wire terminals and the output terminals of said 4-wire side of said converter;
   (d) connecting a second known reference impedance across said 2-wire terminals;
   (e) feeding an oscillating input signal into said input terminals of said 4-wire side of said converter;
   (f) monitoring said input signal fed into said converter and signals output across said 2-wire terminals and said output terminals of said 4-wire side of said converter;
   (g) calculating from said monitored signals said impedance parameters of said 4-wire to 2-wire converter;
   (h) connecting an impedance having a calculated optimum impedance across said 2-wire side of said converter;
   (i) feeding an oscillating input signal into said input terminals of said 4-wire side of said converter; and,
   (j) monitoring signals output across said output terminals of said 4-wire side of said converter to ensure that it is below a predetermined threshold value, to check said calculated impedance parameters.

6. The method of claim 5, wherein said steps (a) to (j) are repeated using oscillating input signals of different frequencies whereby said impedance parameters of said converter are evaluated and checked over a range of different frequencies.

7. The method of claim 6 wherein said impedance parameters are monitored over a plurality of different frequencies extending over a range from 400 Hz to 4000 Hz.

8. The method of claim 7, wherein said plurality of frequencies comprise fourteen different frequencies.

9. An apparatus for determining impedance parameters of a 4-wire to 2-wire converter comprising:
   (a) means to generate an oscillating signal and apply said oscillating signal to input terminals of a 4-wire side of said converter;
   (b) a first known reference impedance;
   (c) a second known reference impedance;
   (d) comparator means to compare two oscillating signals and produce an output representative of the magnitude ratio of said two signals;
   (e) means to feed said oscillating signal applied to said input terminals of said 4-wire side of said converter also to said comparator means;
   (f) switch means to connect one of said first or second known reference impedance across 2-wire terminals of said converter, and also to connect one of said 2-wire terminals and output terminals of said 4-wire side of said converter to said comparator means; and, (g) a computer programmed to calculate said impedance parameters of said converter from said output of said comparator means and values of said first and second reference impedances.

10. The apparatus of claim 9, wherein said means to generate an oscillating signal is capable of generating oscillating signals at a number of different frequencies, and wherein said apparatus is arranged to determine said impedance parameters of said converter at a number of different frequencies.

11. The apparatus of claim 9, wherein said means to generate an oscillating signal and said comparator means are formed by a network analyser.

12. The apparatus of claim 9, further comprising;

(h) a variable impedance; and, wherein said switch means is also arranged to connect said variable impedance across said 2-wire terminals of said converter to enable said calculated impedance parameter to be checked.

13. The apparatus of claim 9, further comprising: means connected across said 2-wire terminals of said converter to provide a DC path between the two terminals to absorb the DC component of the output on the said 2-wire side of said converter to ensure that said first and second reference impedances are de-coupled from any DC feed currents, whereby differences in the DC resistance of said first and second impedances do not affect said determination.

14. The apparatus of claim 13 wherein said means to provide said DC path connected to said 2-wire terminals of said converter include a variable resistor, variations in the resistance of said resistor simulating changes in length of a 2-wire transmission line connected to said 2-wire side of said converter.

15. The apparatus of claim 9, which also includes means to apply a variable phase offset to said oscillating signal applied to said input terminals of said 4-wire side of said converter.

16. The apparatus of claim 9, which also includes a chart plotter connected to said programmed computer to provide a graphical output of the results of said impedance parameter determination of said converter.

17. An apparatus for determining impedance parameters of a 4-wire to 2-wire converter comprising:

(a) means to generate an oscillating signal and apply said oscillating signal to input terminals of a 4-wire side of said converter, said means generating oscillating signals at a number of different frequencies;

(b) a first known reference impedance;

(c) a second known reference impedance;

(d) comparator means to compare two oscillating signals and produce an output representative of the magnitude ratio of said two signals;

(e) means to feed said oscillating signal applied to said input terminals of said 4-wire side of said converter also to said comparator means;

(f) a variable impedance;

(g) switch means to connect one of said first, second known reference impedance, and said variable impedance, across 2-wire terminals of said converter, and also to connect one of said 2-wire terminals and the output terminals of said 4-wire side of said converter to said comparator means;

(h) means connected across said 2-wire terminals of said converter to provide a DC path between the two terminals to absorb the DC component of the output on the 2-wire side of said converter to ensure that said first and second reference impedances are de-coupled from any DC feed currents; and, (i) a computer programmed to calculate said impedance parameters of said converter from said output of said comparator means and values of said first and second reference impedances on each of said number of frequencies, and to check that the output from said 4-wire side of said converter is below a predetermined threshold value when said variable impedance is connected across said 2-wire terminals.

18. The apparatus of claim 17, wherein said means (h) connected to said 2-wire terminals of said converter include a variable resistor, variations in the resistance of said resistor simulating changes in length of a 2-wire transmission line connected to said 2-wire side of said converter.

19. The apparatus of claim 17, which also includes means to apply a variable phase offset to said oscillating signal applied to said input terminals of said 4-wire side of said converter.

20. The apparatus of claim 17, which also includes a chart plotter connected to said programmed computer to provide a graphical output of the results of said impedance parameter determination of said converter.

* * * * *